(12) United States Patent
Ohara

(10) Patent No.: US 7,874,821 B2
(45) Date of Patent: Jan. 25, 2011

(54) TIRE FORMING MOLD

(75) Inventor: Masaaki Ohara, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 23 days.

(21) Appl. No.: 12/528,475

(22) PCT Filed: Mar. 31, 2008

(86) PCT No.: PCT/JP2008/056296

§ 371 (c)(1), (2), (4) Date: Aug. 25, 2009

(87) PCT Pub. No.: WO2008/126710

PCT Pub. Date: Oct. 23, 2008

(65) Prior Publication Data

US 2010/0092590 A1 Apr. 15, 2010

(30) Foreign Application Priority Data

Apr. 10, 2007 (JP) ................. 2007-102410

(51) Int. Cl.
*B29C 33/10* (2006.01)
(52) U.S. Cl. .............. 425/28.1; 425/46; 425/812
(58) Field of Classification Search ......... 425/28.1, 425/35, 46, 812; 249/141
See application file for complete search history.

(56) References Cited

U.S. PATENT DOCUMENTS 2,756,460 A * 7/1956 Heintz, Jr. ............... 425/812
3,692,090 A * 9/1972 Brobeck et al. ......... 425/812

FOREIGN PATENT DOCUMENTS

| JP | 04-338512 | 11/1992 |
| JP | 05-504110 | 7/1993 |
| JP | 08-323771 | 12/1996 |

OTHER PUBLICATIONS

International Preliminary Report on Patentability for Application No. PCT/JP2008/056296, dated Oct. 13, 2009, 4 pages.

* cited by examiner

*Primary Examiner*—James Mackey
(74) *Attorney, Agent, or Firm*—Fish & Richardson P.C.

(57) ABSTRACT

A tire forming mold in which a depression for forming a land portion of a tread surface is provided in a molding surface forming a tread pattern of a tire. The tire forming mold has a pocket provided in the depression, a block fitted into the pocket to form an exhaust chamber in an inner portion of the pocket and holding a laminated blade, which is formed by superposing thin plates, so that one end portion is exposed to the molding surface and the other end portion is exposed to the exhaust chamber, and an exhaust hole having one end portion is communicated with the exhaust chamber and the other end portion is communicated with a mold back face or a mold split face.

4 Claims, 7 Drawing Sheets

(a)

(b)

(c)

TIRE FORMING MOLD

TECHNICAL FIELD

The present invention relates to a tire forming mold which is used for curing a tire and in which a depression for forming a land portion of a tread surface is provided in a molding surface forming a tread pattern of the tire.

BACKGROUND ART

Generally, at a time of curing the tire, the molding surface of the tire forming mold is pressed against the tread surface, and the tread pattern corresponding to a concavo-convex shape of the molding surface is formed. At this time, air existing between the tread surface and the molding surface is compressed into the depression for forming the land portion, however, if the curing is carried out with the air left, there is a problem that a concave chip called as lightness is generated in the tread surface and a defective molding is generated. Accordingly, it is important to suitably discharge the air compressed into the depression out of the mold.

As a lightness countermeasure, it is general to employ a method of piercing a vent hole communicating with an outer side of the mold in the depression, thereby discharging the air. However, since a lot of rubber projections called spew are formed in the tread surface, an ablating work is necessary and there is a problem that the dropout spew is mixed as a foreign material into the mold, which results in a defect. On the contrary, there has been proposed a tire forming mold structured such as to embed a laminated blade obtained by superposing a plurality of thin plates in the depression and the air is discharged through a micro gap (for example, the following patent documents 1 and 2). The micro gap mentioned above is set such that it passes the air therethrough and does not pass a heated and softened rubber therethrough with a viscosity difference.

However, in the case of using the laminated blade in which one end portion is exposed to the molding surface and the other end portion is exposed to a mold back face, such as the following patent document 1, since a tire diametrical distance in which the air moves within the micro gap becomes long and air resistance is increased, an air discharging effect may be obstructed, and thus there is room for further improving this. On the other hand, if the gap of the laminated blade is enlarged in order to improve this, the rubber makes an intrusion into the gap, so that the same problem as that in a case where the vent hole is provided is generated.

Further, in the case of using a laminated blade in which a side end is exposed to the molding surface and an end portion is exposed to a mold split surface (for example, a split surface between segments) such as the following patent document 2, there is a tendency that it becomes hard to discharge the air in a place which is away from the mold split surface, and there is a defect that the air discharging effect depends on an arranged position of the laminated blade. Further, since the laminated blade is directly embedded in the depression in both the following patent documents, a work for setting and regulating the micro gap is complicated.

Patent Document 1: Japanese Unexamined Patent Publication No. 4-338512

Patent Document 2: Japanese Patent No. 3541261

DISCLOSURE OF THE INVENTION

Problems to be Solved by the Invention

The present invention is made by taking the actual condition mentioned above into consideration, and an object of the present invention is to provide a tire forming mold which can lower air resistance in a laminated blade so as to smoothly discharge air, has an air discharging effect which does not depend on an arranged position of the laminated blade, and can easily set and regulate a micro gap of the laminated blade.

Means for Solving the Problems

The object can be achieved by the following present invention. That is, the present invention provides a tire forming mold in which a depression for forming a land portion of a tread surface is provided in a molding surface forming a tread pattern of a tire, the tire forming mold comprising, a pocket provided in a concave manner in the depression; a block fitted into the pocket so as to form an exhaust chamber in an inner portion of the pocket, and holding a laminated blade constructed by superposing thin plates in such a manner that one end portion is exposed to the molding surface and the other end portion is exposed to the exhaust chamber; and an exhaust hole structured such that one end portion is communicated with the exhaust chamber and the other end portion is communicated with a mold back face or a mold split face.

In accordance with the tire forming mold of the present invention, the air pressed into the depression at a time of curing the tire is fed to the exhaust chamber through the micro gap of the laminated blade, and is subsequently fed to the mold back face or the mold split surface through the exhaust hole so as to be discharged to the outer side of the mold. Since the exhaust chamber is formed in the inner portion of the pocket by fitting the block into the pocket provided in the concave manner in the depression of the molding surface, the tire diametrical distance in which the air moves within the micro gap is shortened. As a result, in cooperation with the effect of the air chamber achieved by the exhaust chamber, it is possible to reduce the air resistance in the laminated blade so as to efficiently and smoothly discharge the air while keeping such a micro gap that the rubber can not pass through.

Further, in the present invention, whatever position of the depression the arranged position of the laminated blade is, it is possible to feed the air to the mold back face or the mold split face through the exhaust hole. Even if it is away from the mold back face or the mold split surface, it is possible to secure a smooth discharge of the air, and the air discharging effect does not depend on the arranged position of the laminated blade. Further, since the laminated blade is held by the block fitted to the pocket, it becomes easy to set and regulate the micro gap in comparison with the case that the laminated blade is directly embedded in the depression such as the related art. In addition, in a case where a clogging caused by the curing gas, the rubber or the like is generated in the laminated blade, it is only necessary to clean or replace the laminated blade by detaching the block from the molding surface. Accordingly, a maintaining work is easy.

In the structure mentioned above, it is preferable that the laminated blade is constructed by folding one metal thin plate and superposing bent end portions thereof with each other in a state of energizing in a direction in which they separate from each other, and an end portion formed by superposing the bent end portions of the laminated blade is exposed to the molding surface, and wherein the block is provided with a slit pinching the laminated blade in a side in which the bent end portions are superposed.

The laminated blade having the structure mentioned above is constructed by folding one metal thin plate so as to superpose, and energizing the bent end portions in the direction in which they separate from each other. The energization of the bent end portion as mentioned above may include a utilization of a spring back at a time of folding the thin plate so as to elastically deform. Further, since the side in which the bent end portions of the laminated blade are superposed is pinched by the slit provided in the block, it is possible to suitably hold the laminated blade and secure the micro gap. In addition, it is possible to easily set and regulate the micro gap by regulating an interval of the slit and a thickness of the laminated blade.

In the structure mentioned above, it is preferable that the block is provided as a C-shaped cross sectional shape having a base portion constructing a part of a surface of the depression while holding the laminated blade, and a pair of protruding portions protruding from the base portion to a mold back face side so as to reach a bottom wall of the pocket, and wherein the exhaust chamber is surrounded by the base portion, the bottom wall of the pocket and the pair of protruding portions.

In accordance with the structure mentioned above, since the laminated blade is held by the base portion of the block as mentioned above, it is possible to widely shorten the tire diametrical distance in which the air moves within the micro gap, and it is possible to better reduce the air resistance in the laminated blade. Further, since the exhaust chamber is surrounded by the base portion, the bottom wall of the pocket and a pair of protruding portions, the exhaust chamber comes to a state in which it is suitably interrupted from the molding surface, and it is possible to securely feed the air fed to the exhaust chamber through the micro gap to the exhaust hole so as to discharge the air to the outer side of the mold.

In the present invention, the block provided in the plate shape can be fitted to the pocket in such a manner as to be supported to the step portion provided in the side wall of the pocket. In accordance with the structure mentioned above, since the shape of the block becomes simple, it is possible to construct simply and with a low cost.

Figure 1:
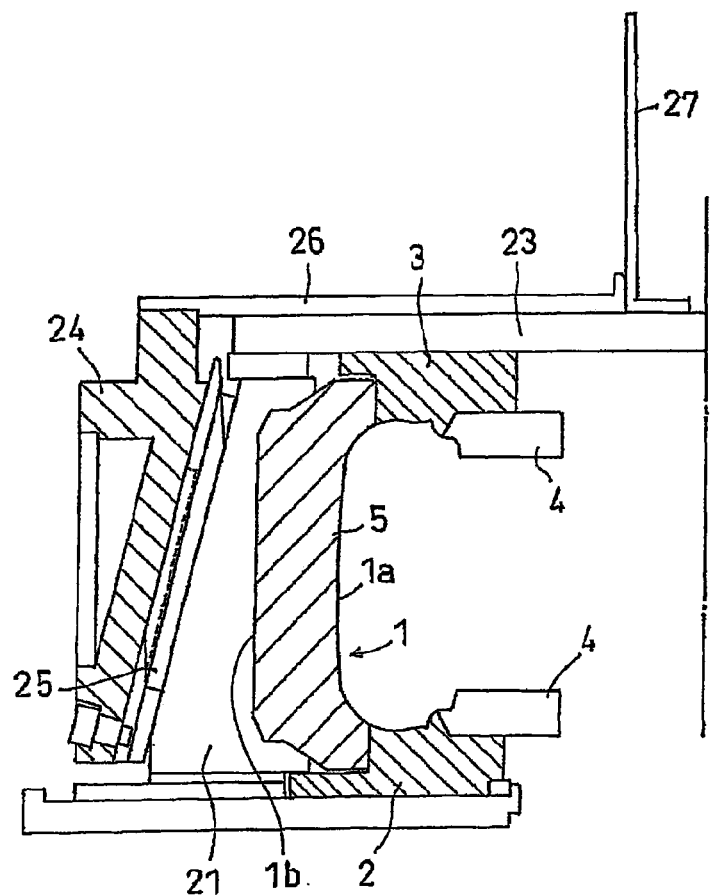
FIG. 1 is a vertical cross sectional view showing an example of a tire forming mold in accordance with the present invention.

DESCRIPTION OF REFERENCE SYMBOLS 1a molding surface
1b mold back face
5 sector
6 depression
7 convex portion
10 pocket
10a bottom wall
11 block
12 exhaust chamber
13 laminated blade
13a one end portion of laminated blade
13b other end portion of laminated blade
14 exhaust hole
15 thin plate
15a bent end portion
16 base portion
17 protruding portion
S slit

BEST MODE FOR CARRYING OUT THE INVENTION

An embodiment of the present invention will be explained with reference to the drawings. FIG. 1 is a vertical cross sectional view showing an example of a tire forming mold in accordance with the present invention, and shows a mold clamping state. In FIG. 1, a green tire (not shown) is set in such a manner that a tire axial direction is arranged up and down, a right direction in FIG. 1 corresponds to an inner side in a tire diametrical direction, and a left direction in FIG. 1 corresponds to an outer side in the tire diametrical direction. In the present embodiment, there is shown an example in which the forming mold is of a segmented type.

Figure 2:
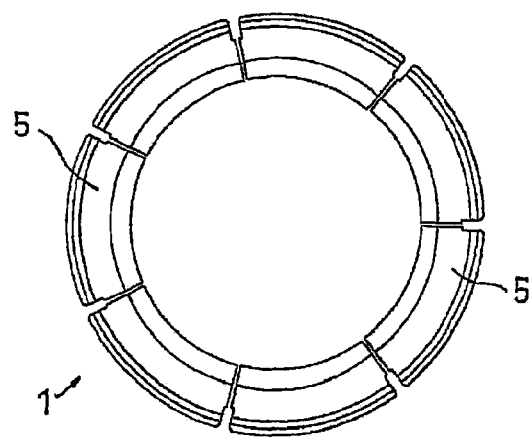
FIG. 2 is a plan view of an annular mold portion.

The tire forming mold (hereinafter, often refer simply to as a forming mold) is provided with an annular mold portion 1 having the molding surface 1a brought into contact with a tread portion of the tire, a lower mold portion 2 with which a lower side wall portion comes into contact, and an upper mold portion 3 with which an upper side wall portion comes into contact. A bead ring 4 is provided in an inner side in the tire diametrical direction of the lower mold portion 2 and the upper mold portion 3, and the structure is made such that a bead core of the tire can be fitted. The annular mold portion 1 is constructed by a combination of sectors 5 which are divided in a tire circumferential direction as shown in FIG. 2, and the sectors 5 are connected in a circular arc shape by bringing end faces into contact with each other in a mold clamped state.

A container 21 is attached to a mold back surface 1b of the forming mold. The container 21 is provided in each of the divided sectors 5, and is attached to a lower surface of a side plate 23 fixed to an elevating cylinder (not shown) so as to be slidable along the tire diametrical direction. A sliding rail 25 is provided with an inclined surface in an outer side in the tire diametrical direction of the container 21, and a cone ring 24 is fitted so as to be slidable along a direction of inclination. The cone ring 24 is supported to a platen (not shown) which can be moved up and down relatively with respect to the side plate 23 from the above. Reference symbols 26 and 27 indicate air seal plates.

In accordance with the structure mentioned above, it is possible to move up the cone ring 24 and move the container 21 to the outer side in the tire diametrical direction by moving up the platen from the state shown in FIG. 1, so as to take off each of the sectors 5 from the lower mold portion 2 and the upper mold portion 3, and it is possible to move up the side plate 23 and the container 21 and take off the sector 5 and the upper mold portion 3 from the lower mold portion 2 by moving up the elevating cylinder so as to change to the mold open state. A transition from the mold open state to the mold clamped state may be achieved by reversely carrying out the motions mentioned above, and it is possible to press the molding surface 1a against the tread surface by clamping after setting the green tire.

Figure 3:
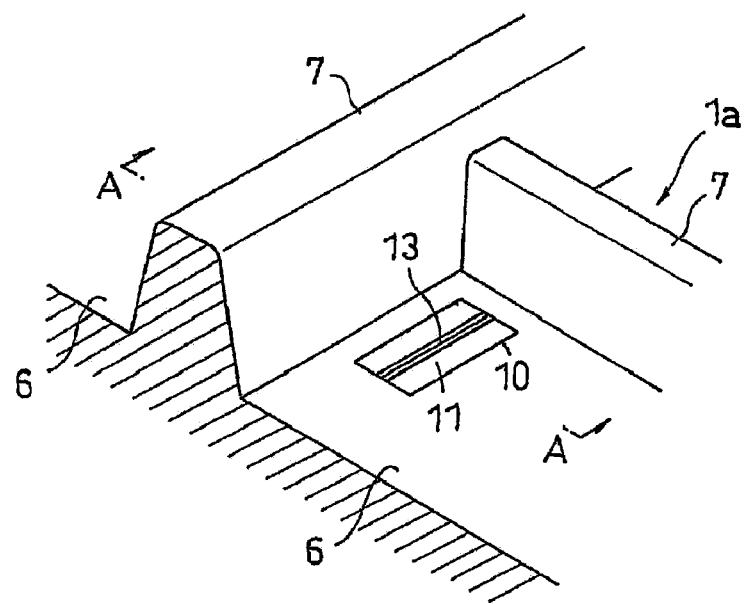
FIG. 3 is a perspective view showing a substantial part of the molding surface.
Figure 4:
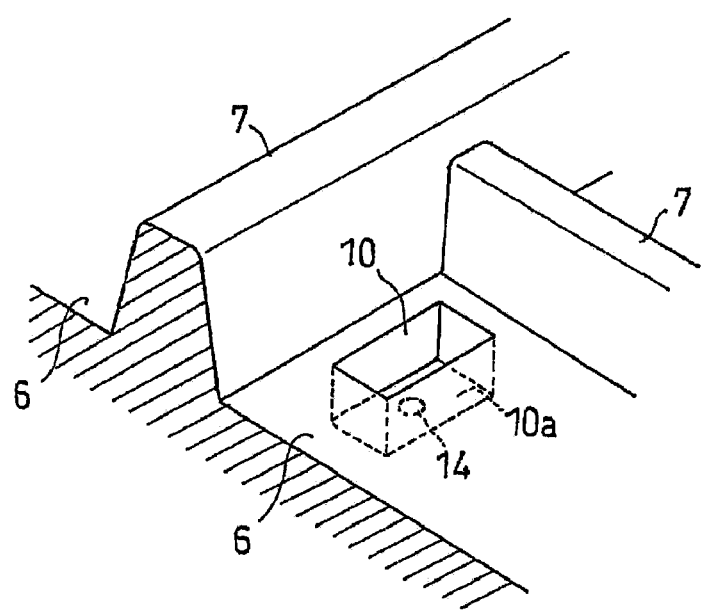
FIG. 4 is a perspective view showing a substantial part of the molding surface.
Figure 5:
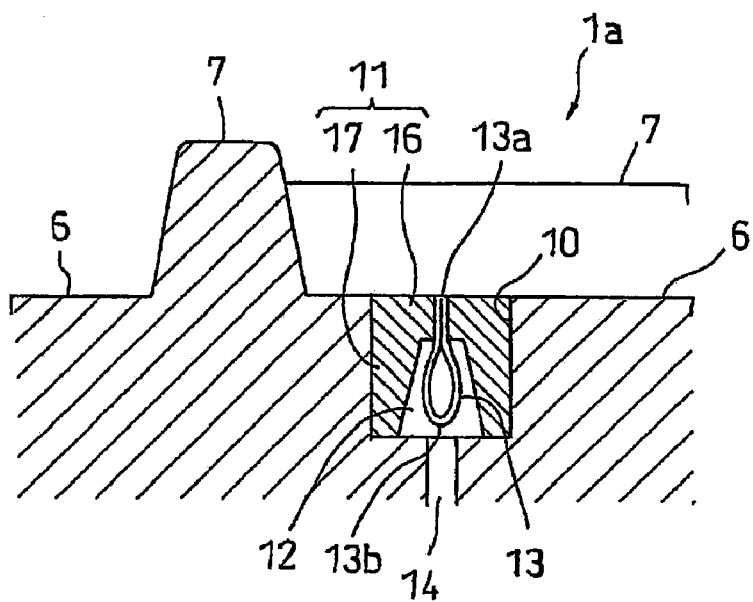
FIG. 5 is a cross sectional view as seen from an arrow A-A in FIG. 3.

FIGS. 3 and 4 are perspective views showing a substantial part of the molding surface 1a, in which FIG. 4 shows a state in which the block 11 is detached from the molding surface 1a. FIG. 5 is a cross sectional view as seen from an arrow A-A in FIG. 3. In FIGS. 3 to 5, an upper side corresponds to an inner side in a tire diametrical direction, and a lower side corresponds to an outer side in the tire diametrical direction (close to the mold back face 1b).

Figure 6:
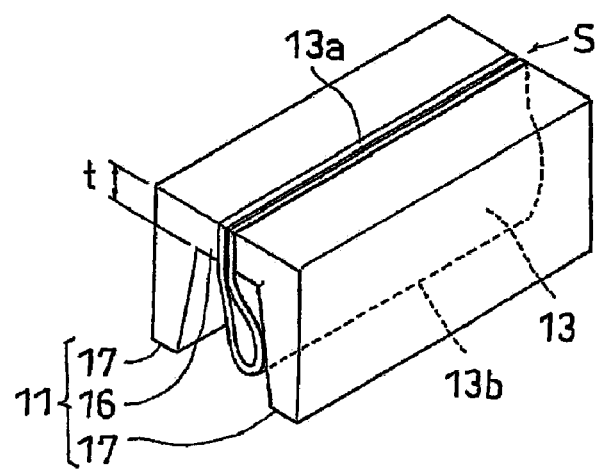
FIG. 6 is a perspective view showing a block fitted a pocket.

A concavo-convex shape corresponding to a tread pattern is formed in the molding surface 1a, and the molding surface 1a is provided with a depression 6 for forming a land portion and a convex portion 7 for forming a groove portion as shown in an illustrate example. A pocket 10 is provided in a concave manner in the depression 6, and a block 11 is fitted to the pocket 10 in such a manner as to fill the concave. The block 11 is fitted to the pocket 10 in a state of holding a laminated blade 13 as shown in FIG. 6.

In the present embodiment, in the light of securing a tread appearance after curing, the block 11 is formed by the same kind of metal as a base material (for example, an aluminum alloy) of the forming mold, and is structured such as to be press-fitted to the pocket 10 so as to prevent the rubber from making an intrusion into a boundary face. In the present invention, the block 11 may be formed by a different kind of metal from the base material of the forming mold. For example, in a case where the forming mold is made of an iron, a block formed by the aluminum alloy may be employed. Further, in the present embodiment, there is shown an example in which the pocket 10 is provided as a rectangular parallelepiped shape, however, the present invention is not limited to this, but any shape may be applied as far as an air discharging effect as mentioned below can be achieved.

The block 11 is structured, as shown in FIG. 5, such that an exhaust chamber 12 is formed in an inner portion of the pocket 10 with the block 11 fitted to the pocket 10. In the present embodiment, the exhaust chamber 12 formed as a trapezoidal cross sectional shape is provided between the block 11 and the inner wall of the pocket 10 with facing a bottom wall 10a of the pocket 10. The laminated blade 13 is formed by superposing metal thin plate, and is held in such a manner that one end portion 13a is exposed to the molding surface 1a and the other end portion 13b is exposed to the exhaust chamber 12. The exhaust hole 14 is structured such that one end portion is open to the bottom wall 10a of the pocket 10 so as to be communicated with the exhaust chamber 12, and the other end portion (not shown) is communicated with the back face surface 1b, and is extended in the tire diametrical direction by making a cross sectional area larger than a micro gap of the laminated blade 13.

The block 11 in accordance with the present embodiment is provided as a C-shaped cross sectional shape having a base portion 16 constructing a part of a surface of the depression 6 while holding the laminated blade 13, and a pair of protruding portions 17 protruding from both side of the base portion 16 to the mold back face 1b side so as to reach a bottom wall 10a of the pocket 10. The exhaust chamber 12 is surrounded by a base portion 16, the bottom wall 10a of the pocket 10 and a pair of protruding portions 17, and is communicated with the molding surface 1a by the micro gap of the laminating blade 13 in a state of being suitably interrupted from the molding surface 1a.

Figure 7:
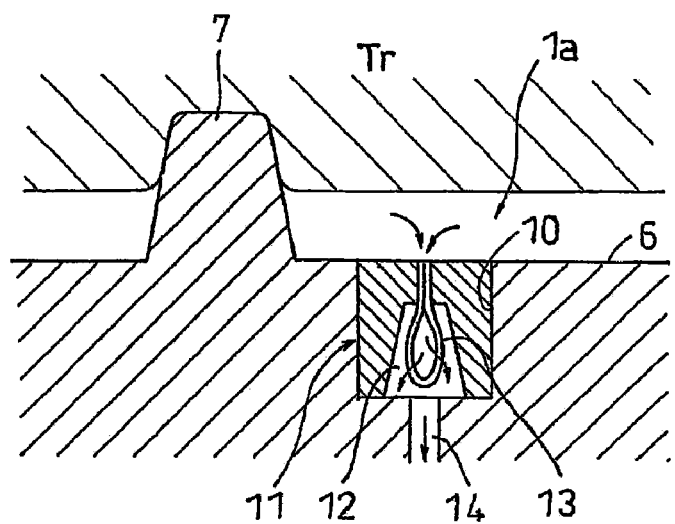
FIG. 7 is a cross sectional view as seen from an arrow A-A in FIG. 3 at a time of curing.

At a time of curing, as shown in FIG. 7, a tread surface Tr of the green tire is pressed against the molding surface 1a, and the land portion corresponding to the depression 6 and the groove portion corresponding to the convex portion 7 are formed. At this time, the air existing between the tread surface Tr and the molding surface 1a is compressed to the depression 6, however, the air is fed to the exhaust chamber 12 through the micro gap from the end portion 13a of the laminated blade 13 with an atmospheric pressure difference between the molding surface 1a and the exhaust chamber 12. A tire diametrical distance in which the air moves within the micro gap is very short in comparison with the related art, and in cooperation with an effect of an air chamber achieved by the exhaust chamber 12, it is possible to reduce air resistance in the laminated blade 13 so as to efficiently and smoothly discharge the air while keeping such a micro gap that the rubber does not pass through.

The air fed to the exhaust chamber 12 is fed to the mold back face 1b through the exhaust hole 14, and is discharged to an outer side of the mold via the gap with the container 21. At this time, it is possible to utilize a vacuum apparatus, or it is possible to enhance an air discharging performance by connecting a vent hole provided in the container 21 to the other end portion of the exhaust hole 14. Since the rubber does not make an intrusion into the exhaust hole 14, an inner diameter of the exhaust hole 14 can be appropriately set. Accordingly, an inner diameter is between $\phi 0.5$ and $\phi 1.5$ mm in the vent hole provided in the depression 6, and on the contrary, an inner diameter can be set between $\phi 3$ and $\phi 5$ mm in the exhaust hole 14. Accordingly, it is possible to smoothly discharge the air. Further, in the forming mold, whatever position of the depression 6 the arranged position of the laminated blade 13 is, it is possible to feed the air to the mold back face 1b through the exhaust hole 14, whereby the air discharging effect does not depend on the arranged position of the laminated blade 13.

The micro gap of the laminated blade 13 is set, for example, to about 10 to 30 μm in such a manner as to pass the air therethrough and prevent the heated and softened rubber from passing therethrough with a viscosity difference. Accordingly, it is very important to set and regulate the micro gap, however, the laminated blade 13 is not directly embedded in the depression 6 conventionally, and it is possible to easily carry out a work for setting or regulating the micro gap, by detaching the block 11 from the molding surface 1a. In addition, in a case where a clogging caused by the curing gas, the rubber or the like is generated in the laminated blade 13, it is only necessary to clean or replace the laminated blade 13 by detaching the block 11 from the molding surface 1a. Accordingly, a maintaining work is easy.

Various methods can be employed for detaching the block 11 from the molding surface 1a. For example, it is possible to insert a rod to the exhaust hole 14 from the mold back face 1b and knock up the block 11 by the rod so as to take out it. Alternatively, a hole for taking out is provided in the block 11 from the molding surface 1a side by using a drill and it is possible to pull up the block 11 in accordance with a leverage by utilizing the hole.

Figure 8:
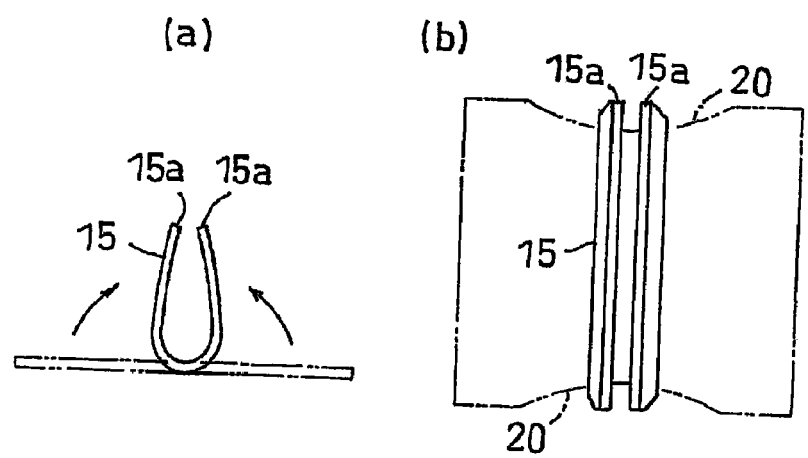
FIGS. 8(a) and 8(b) are a front elevational view and a plan view which show a state of folding a thin plate constructing a laminated blade.

The laminated blade 13 in accordance with the present embodiment is constructed, as shown in FIG. 8, by folding one metal thin plate 15 and superposing bent end portions 15a in a state of energizing the bent end portions 15a in a direction in which they separate from each other. The energization of the bent end portion 15a utilizes a spring back at a time of folding the thin plate 15 so as to elastically deform. The laminated blade 13 is structured, as shown in FIG. 5, such that the end portion 13a formed by superposing the bent end portions 15a with each other is exposed to the molding surface 1a.

Figure 9:
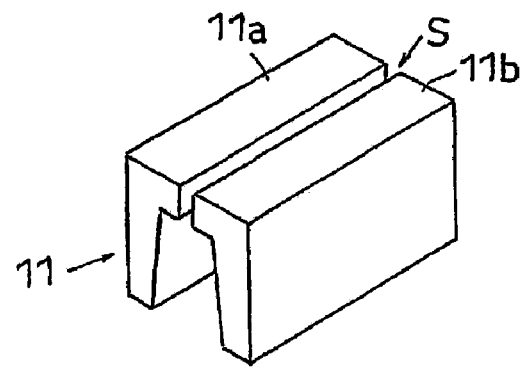
FIG. 9 is a perspective view showing a block.

The block 11 is constructed by two block pieces 11a and 11b as shown in FIG. 9, and is used with a slit S provided between them. In other words, the laminated blade 13 is pinched by the slit S in the side in which the bent end portions 15a are superposed with each other, as shown in FIGS. 5 and 6, by pinching the laminated blade 13 by the block pieces 11a and 11b in the side in which the bent end portions 15a are superposed with each other, and press-fitting them into the pocket 10.

In the state in which the laminated blade 13 is held by the block 11 as mentioned above, the bent end portion 15a of the thin plate 15 is pressed against the slit wall surface of the block 11 by the energization mentioned above, and the laminated blade 13 is pinched by the slit S with its back face supported to the base portion 16. Accordingly, it is possible to suitably hold the laminated blade 13 by the block 11, and it is possible to suitably secure the micro gap of the laminated blade 13. In addition, it is possible to easily set and regulate the micro gap of the laminated blade 13 by regulating an interval of the slit S and a thickness of the laminated blade 15. The interval of the slit S is defined by a dimensional difference between the pocket 10 and the block 11.

The laminated blade 13 is formed as a U-shaped form as shown in FIG. 8(a) with the thin plate 15 only folded, however, the interval around the bent end portion 15a is narrowed by pinching it by the slit S of the block 11, and a flask shape as shown in FIG. 5 is formed. In other words, the laminated blade 13 is structured such that the thin plate 15 is superposed in the end portion 13a exposing to the molding surface 1a, however, the laminated blade 13 is formed such a shape as to expand the gap by curving the thin plate 15 as a loop shape, in the end portion 13b exposing to the exhaust chamber 12. Accordingly, the tire diametrical distance in which the air moves within the micro gap is approximately identical to the thickness of the base portion 16 and becomes widely shortened in comparison with the related art.

In the present embodiment, a notch 20 as shown in FIG. 8(b) is provided in the thin plate 15 constructing the laminated blade 13, whereby a length (a length in a vertical direction in FIG. 8(b)) of the laminated blade 13 becomes shorter in the end portion 13b exposing to the exhaust chamber 12 than in the end portion 13a exposing to the molding surface 1a. Accordingly, in the present embodiment in which the laminated blade 13 has the same length as the pocket 10, an interval may be provided between the end portion 13b and a side wall of the pocket 10, and it is possible to secure the air discharge from the micro gap within the exhaust chamber 12. As shown in the other embodiment mentioned below, the present invention is not limited to this.

As a depth of the pocket 10, a depth between 10 and 20 mm is exemplified, but not limited thereto, the depth can be appropriately set while taking a volumetric capacity of the formed exhaust chamber 12 into consideration. Further, as a thickness t of the base portion 16, a thickness between 5 and 10 mm is exemplified, but not limited thereto, the thickness can be appropriately set in such a manner that the base portion 16 is not deformed by an internal pressure at a time of curing, in such a manner that the micro gap of the laminated blade 13 is set to a desired size and while taking a shape and a material of the block 11 into consideration. A raw material of the laminated blade 13 is not particularly limited, however, a stainless steel, a chrome steel and a phosphor bronze are exemplified.

The pneumatic tire in accordance with the present invention is similar to a normal pneumatic tire except provision of the air discharge structure as mentioned above, and it is possible to employ the conventionally known material, shape, structure and the like to the present invention.

Other Embodiment (1) The present invention is not limited to the embodiment mentioned above, but can be variously modified and changed within the scope of the present invention, and the shape of the depression or the convex portion provided in the molding surface is not limited particularly. Further, in the embodiment mentioned above, there is shown the example in which the forming mold is of the segmented type, however, a 2-piece type may be employed in place thereof, or it is possible to apply to a piece mold in which the sector is formed by combining a plurality of pieces. Further, in the present invention, in addition to the molding surface forming the tread pattern, the air discharge structure as mentioned above may be provided in the molding surface forming the side wall surface of the tire.

Figure 10:
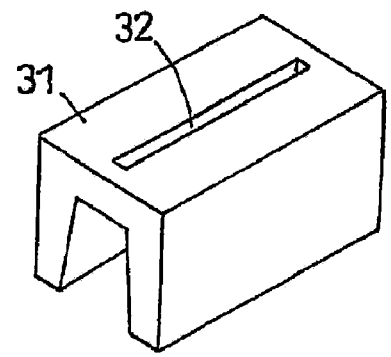
FIG. 10 is a perspective view showing a block in accordance with other embodiment of the present invention.

(2) FIG. 10 is a perspective view of a block in accordance with the other embodiment of the present invention. The block 31 is provided by a single member, and a slit 32 is provided in a base portion thereof. A side in which the bent end portions are superposed with each other in the laminated blade as mentioned above is inserted to the slit 32, and the laminated blade is held in such a manner that one end portion is exposed to the molding surface. In accordance with the block 31 mentioned above, since the interval of the slit 32 does not fluctuate, it is possible to stably hold the laminated blade and it becomes easy to handle it, whereby a workability is improved. Further, it is possible to well secure the air discharge from the micro gap within the exhaust chamber without provision of the notch as shown in FIG. 8(b) in the thin plate constructing the laminated blade.

Figure 11:
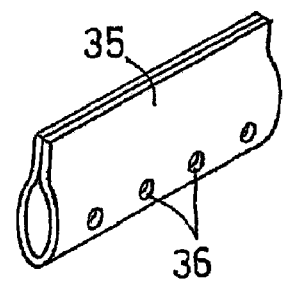
FIG. 11 is a perspective view showing a laminated blade in accordance with other embodiment of the present invention.

(3) FIG. 11 is a perspective view of a laminated blade in accordance with the other embodiment of the present invention. A through hole 36 is provided in a thickness direction of a thin plate, in a portion exposing to the exhaust chamber in the laminated blade 35. Accordingly, since the air fed through the micro gap is discharged to the exhaust chamber via the through hole 36, it is possible to further enhance the air discharging performance.

(4) In the embodiment mentioned above, there is shown the example in which the end portion 13a of the laminated blade 13 is arranged in the surface of the depression 6, however, the end portion 13a may be protruded from the surface of the depression 6. In this case, the protruding portion of the laminated blade 13 may serve for forming a sipe. Further, the laminated blade used in the present invention is not limited to be constructed by one thin plate, but may be constructed by superposing a plurality of thin plates. In the case mentioned above, a micro hole may be provided in a mating face of the thin plate so as to secure the micro gap.

Figure 12:
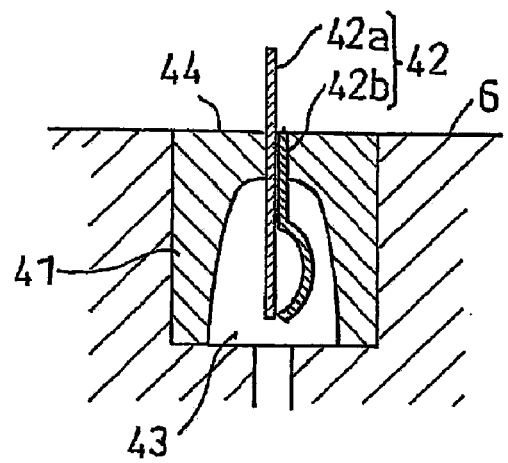
FIG. 12 is a cross sectional view showing a laminated blade in accordance with other embodiment of the present invention.

FIG. 12 is a cross sectional view of a laminated blade in accordance with the other embodiment of the present invention. A laminated blade 42 held by a block 41 is constructed by superposing two thin plates 42a and 42b, and one thin plate 42a protrudes from the surface of the depression 6 so as to serve for forming the sipe. Further, the other thin plate 42b is bent within an exhaust chamber 43, and a tire diametrical distance in which the air moves within the micro gap is set short. The laminated blade 42 is fixed to a base portion 44 of the block 41 by a fixing means such as a pin stop, a spot welding or the like, and is structured such as to secure the micro gap and prevent the thin plate 42a from being drawn out by the tire which is released from the mold after the curing.

(5) In the embodiment mentioned above, there is shown the example in which the exhaust hole 14 is communicated with the mold back face 1b, however, the present invention is not limited to this, but may be structured such as to be communicated with the mold split surface. The mold split surface is a split surface of a mold portion provided with the exhaust hole, and the other mold portion with which the mold portion comes into contact. In the embodiment mentioned above, the split surface between the sectors 5 corresponds to this. Further, the number of the exhaust holes provided in one pocket is not limited particularly, but may be appropriately set while taking into consideration an amount and a pressure of the air to be discharged, a volumetric capacity of the exhaust chamber, presence or absence of the vacuum and the like.

(6) In the embodiment mentioned above, there is shown the example in which the end portion 13b of the laminated blade 13 exposing to the exhaust chamber 12 is away from the bottom wall 10a of the pocket 10, however, in the present invention, the end portion 13b may come into contact with the bottom wall 10a of the pocket 10. Since the laminated blade in this case is positioned in a depth direction of the pocket while being held by the block, the laminated blade is not pushed by the internal pressure at a time of the curing so as to be pressed to the exhaust chamber side. In the case mentioned above, it is desirable to shift the positions of the exhaust holes in such a manner as to prevent the opening of the exhaust hole from being closed by the laminated blade.

Figure 13:
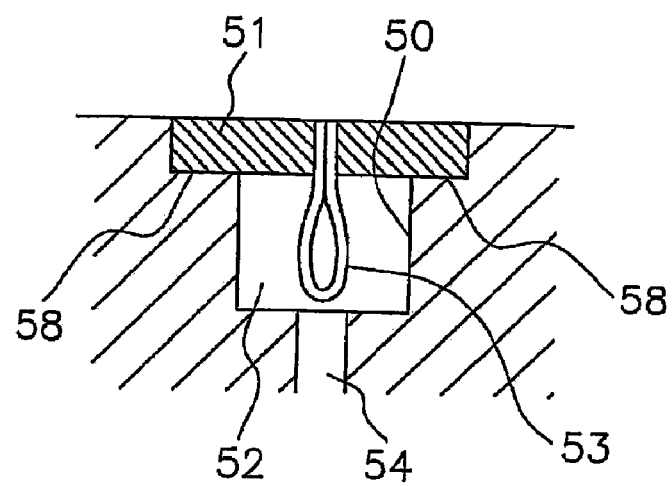
FIG. 13 is a cross sectional view showing a substantial part of a tire forming mold in accordance with other embodiment of the present invention.

(7) FIG. 13 is a cross sectional view of a substantial part of a tire forming mold in accordance with the other embodiment of the present invention. In this embodiment, a step portion 58 is provided in a side wall of a pocket 50, and a plate-like block 51 holding a laminated blade 53 is fitted to the pocket 50 in such a manner as to be supported to the step portion 58. Further, an exhaust chamber 52 is formed in an inner portion of the pocket 50, and an exhaust hole 54 is communicated with the exhaust chamber 52 as the embodiment mentioned above. In accordance with the structure mentioned above, since a shape of the block becomes simple, it is possible to construct simply and with a low cost.

Figure 14:
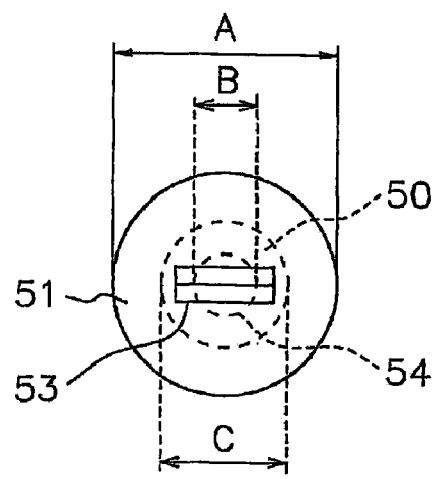
FIG. 14 is a plan view showing a substantial part of the tire forming mold in FIG. 13.
Figure 14:
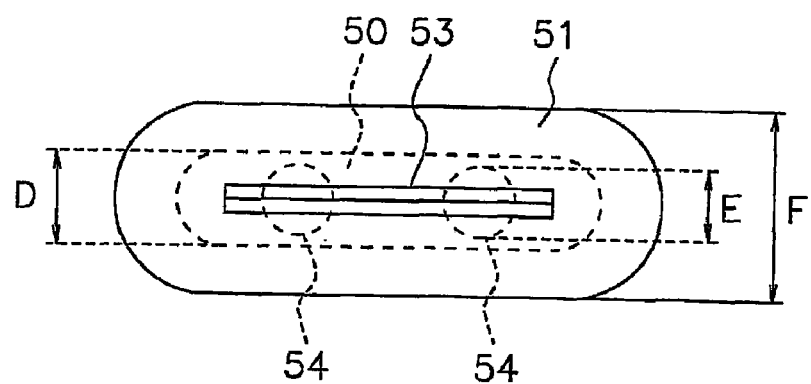
Figure 14:
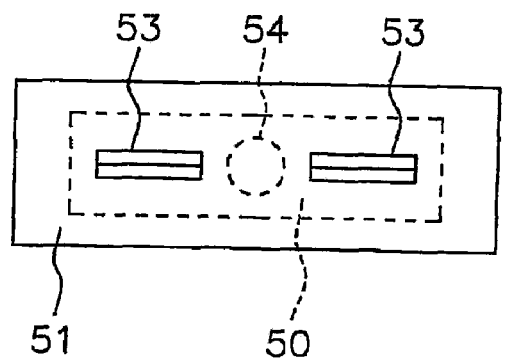

FIG. 14 is a plan view of a substantial part of the tire forming mold in FIG. 13, and shows a plurality of modified examples. FIG. 14(a) shows an example in which the pocket 50 and the block 51 are formed as a circular shape. FIG. 14(b) shows an example in which the pocket 50 and the block 51 are formed as an elongated shape, and a plurality of exhaust holes 54 are communicated with the pocket 50. FIG. 14(c) shows an example in which the block 50 holds a plurality of laminated blades 53. As a specific dimension, there is exemplified that a diameter A is 10 mm, a diameter B is 2 mm, a diameter C is 5 mm, a diameter D is 2.5 mm, a diameter E is 2 mm and a diameter F is 5 mm.

The invention claimed is:

1. A tire forming mold in which a depression for forming a land portion of a tread surface is provided in a molding surface forming a tread pattern of a tire, the tire forming mold comprising:
   a pocket provided in a concave manner in said depression;
   a block fitted into said pocket so as to form an exhaust chamber in an inner portion of said pocket, and holding a laminated blade constructed by superposing thin plates in such a manner that one end portion is exposed to said molding surface and the other end portion is exposed to said exhaust chamber; and
   an exhaust hole structured such that one end portion is communicated with said exhaust chamber and the other end portion is communicated with a mold back face or a mold split face.

2. A tire forming mold according to claim 1, wherein said laminated blade is constructed by folding one metal thin plate and superposing bent end portions thereof with each other in a state of energizing in a direction in which they separate from each other, and an end portion formed by superposing said bent end portions of said laminated blade is exposed to said molding surface, and
   wherein said block is provided with a slit pinching said laminated blade in a side in which said bent end portions are superposed.

3. A tire forming mold according to claim 1, wherein said block is provided as a C-shaped cross sectional shape having a base portion constructing a part of a surface of said depression while holding said laminated blade, and a pair of protruding portions protruding from said base portion to a mold back face side so as to reach a bottom wall of said pocket, and
   wherein said exhaust chamber is surrounded by said base portion, the bottom wall of said pocket and said pair of protruding portions.

4. A tire forming mold according to claim 1, wherein said block is provided in a plate shape, and is fitted to said pocket in such a manner as to be supported to a step portion provided in a side wall of said pocket.

* * * * *